(12) United States Patent
Futami

(10) Patent No.: US 7,436,553 B2
(45) Date of Patent: Oct. 14, 2008

(54) IMAGE READING DEVICE, IMAGE READING METHOD AND IMAGE FORMING APPARATUS

(75) Inventor: Hiroyuki Futami, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1021 days.

(21) Appl. No.: 10/903,404

(22) Filed: Jul. 30, 2004

(65) Prior Publication Data

US 2006/0023080 A1 Feb. 2, 2006

(51) Int. Cl.
H04N 1/04 (2006.01)
H04N 1/40 (2006.01)

(52) U.S. Cl. .................... 358/443; 358/471; 358/463; 358/474

(58) Field of Classification Search ............ 358/443, 358/471, 463, 474; 713/500–503; 347/255
See application file for complete search history.

(56) References Cited

U.S. PATENT DOCUMENTS 6,954,292 B2 * 10/2005 Inoue ................. 358/475
6,958,830 B2 * 10/2005 Kono ................. 358/443
7,385,732 B2 * 6/2008 Sakai ................. 358/463

* cited by examiner

Primary Examiner—Houshang Safaipour
(74) Attorney, Agent, or Firm—Lucas & Mercanti, LLP

(57) ABSTRACT

An image reading device includes: a solid-state image sensor for converting image information into an electric signal; an analog processing section for generating an analog processing signal by sampling and amplifying the electric signal at a sampling position; an A/D converting section for converting the analog processing signal into a digital signal; a pulse generating section for generating a control pulse to the solid-state image sensor, the analog processing section and the A/D converting section; and a control section for controlling a pulse generating timing of the pulse generating section, wherein the analog processing section comprises an amplification processing section for amplifying the electric signal so as to set an output voltage to a set voltage, the pulse generating section includes a varying section for varying the sampling position, and the control section includes an optimizing section for optimizing the sampling position based on variance of amplification gain values.

13 Claims, 8 Drawing Sheets

FIG.8

| SAMPLING POINT | AMPLIFICATION GAIN VALUE | SAMPLING POSITION |
|---|---|---|
| 1 | 2.5 | a |
| 2 | 2.0 | |
| 3 | 1.5 | b |
| 4 | 1.3 | e |
| 5 | 1.2 | |
| 6 | 1.1 | c |
| 7 | 1.2 | |
| 8 | 1.3 | |
| 9 | 1.3 | f |
| 10 | 1.7 | d |

IMAGE READING DEVICE, IMAGE READING METHOD AND IMAGE FORMING APPARATUS

BACKGROUND OF THE INVENTION

1. Field of the Invention

This invention relates to an image reading device of an image forming apparatus. In more detail, this invention relates to an image reading device, an image reading method and an image forming apparatus each using a solid-state image sensor.

2. Description of Related Art

In recent years, a copying machine has been drastically improved to be faster and to obtain higher resolution. Thereby, an electronic circuit within the copying machine is required to be even faster. In particular, when image information converted into electric signals is to be read from a solid-state image sensor which senses image information of light, in view of two requests which are to increase the number of data points in conjunction with obtaining higher resolution and to be faster, it is required to be yet even faster. Therefore, a basic clocking signal at the time of reading image information is made faster.

However, according to the above-mentioned earlier art, when image information is to be read from a solid-state image sensor, there is a possibility of reading wrong image information. In other words, since image information in a solid-state image sensor is outputted as electric signals only during a signal period on an output timing chart, if a sampling position is not included in the signal period, sampling of image information is not accurately performed.

In particular, in conjunction with the requirement of making it faster, in a solid-state image sensor which is represented by CCD, a basic clock is made to have high frequency. Thus, the signal period generated according to the basic clock is made shorter. In addition, although a sampling position is set out in consideration of signal delay according to artwork wiring on a printed board, there is a difficulty of setting out a sampling position in consideration of variation of electric characteristics of each electric device, especially a semiconductor device.

Based on these problems, it is extremely important how to achieve the sampling of output electric signals from a solid-state image sensor within a signal period, in order to obtain accurate image information.

SUMMARY OF THE INVENTION

The present invention was made in order to solve the foregoing problems, and an object of the present invention is to realize an image reading device, an image reading method and an image forming apparatus each being capable of sampling electric signals outputted from a solid-state image sensor within a signal period.

In order to solve the foregoing problems and to achieve the above-mentioned object, in accordance with a first aspect of the present invention, an image reading device comprises: a solid-state image sensor for converting image information from a light signal into an electric signal; an analog processing section for generating an analog processing signal by sampling and amplifying the electric signal at a sampling position; an A/D converting section for converting the analog processing signal into a digital signal; a pulse generating section for generating a control pulse to the solid-state image sensor, the analog processing section and the A/D converting section; and a control section for controlling a pulse generating timing of the pulse generating section, wherein the analog processing section comprises an amplification processing section for amplifying the electric signal by varying an amplification gain of the electric signal so as to set an output voltage to a set voltage, the pulse generating section comprises a varying section for varying the sampling position of the electric signal, and the control section comprises an optimizing section for optimizing the sampling position based on variance information of amplification gain values obtained when the varying section varies the sampling position.

According to the device of the first aspect, even if a signal period of an electric signal is shortened due to the speed up, and a sampling position varies according to variance of characteristic of electric devices or the like, by optimizing the sampling position with the varying section, it is possible to sample image information within the signal period.

Preferably, the analog processing section comprises a clamping section for varying dc component of the electric signal before sampling the electric signal.

According to the above-mentioned device, it is possible to have amplitude of the sampling signal proportional to electric charge amount accumulated in CCD (Charge Coupled Device), that is, image information amount.

Preferably, the optimizing section sets the sampling position having a minimum amplification gain value among the amplification gain values obtained by varying the sampling position, as an optimized sampling position.

According to the above-mentioned device, it is possible to detect a part of image information within the signal period during which the maximum amplitude can be obtained, and to optimize the sampling position.

Preferably, the control section comprises a sampling condition setting section for setting a sampling condition of the electric signal, and the optimizing section optimizes the sampling position according to the set sampling condition.

More preferably, the sampling condition comprises a position to start sampling the electric signal, a sampling point number and a sampling range.

Preferably, the control section stores the sampling position optimized by the optimizing section, and the amplification gain values at each sampling point, when the optimizing section is to be operated once again, the sampling condition setting section resets the sampling condition based on the sampling position and the amplification gain values at each sampling point, each of which is stored in a previous operation of the optimizing section, and the optimizing section optimizes the sampling position once again according to the reset sampling condition.

Preferably, the device further comprises an operating section for an operator to input control information, wherein the control section comprises an activating condition setting section for setting an activating condition of the optimizing section according to an operation at the operating section, and activates the optimizing section according to the set activating condition.

More preferably, the activating condition comprises information indicating an activating time of the optimizing section and existence of an optimization operation after a power is on.

According to the above-mentioned device, even if the sampling position varies due to temperature change after the power is on or another reason, by activating the optimizing section, it is possible to sample optimal image information within the signal period.

Preferably, when the optimizing section is to be operated once again, the control section sets the sampling position optimized by a previous operation of the optimizing section, to the pulse generating section.

Preferably, the image information comprises color image information.

More preferably, the pulse generating section comprises the varying section for each constituent color of the color image information, and the control section comprises the optimizing section for each constituent color of the color image information.

In accordance with a second aspect of the present invention, an image reading method comprises: converting image information from a light signal into an electric signal; generating an analog processing signal by sampling and amplifying the electric signal at a sampling position; A/D-converting the analog processing signal into a digital signal; generating a control pulse for controlling the generating of the analog processing signal and the A/D-converting; and controlling a timing for generating a pulse when the control pulse is generated, wherein the generating of the analog processing signal comprises amplifying the electric signal by varying an amplification gain of the electric signal so as to set an output voltage to a set voltage, the generating of the control pulse comprises varying the sampling position of the electric signal, and the controlling comprises optimizing the sampling position based on variance information of amplification gain values obtained by varying the sampling position.

According to the method of the second aspect, even if a signal period of the electric signal is shortened by the speed up, and further a sampling position is changed according to characteristics of electric devices or the like, by optimizing a sampling position, it is possible to sample image information within a signal period.

In accordance with a third aspect of the present invention, an image forming apparatus comprises: an operating section for an operator to input information; an image reading section for converting a document into an electric signal as image information, for sampling and amplifying the electric signal at a sampling position; an image processing section for applying an image process on the image information; and an image transferring section for transferring the image information on transfer paper, wherein the image reading section comprises: an amplification processing section for amplifying the electric signal so as to set an output voltage to a set voltage; and an optimizing section for varying the sampling position of the electric signal, and for optimizing a sampling position by calculating a minimum amplification gain value among amplification gain values obtained by varying the sampling position.

According to the apparatus of the third aspect, it is possible to obtain high quality image information by optimizing the position to be sampled by the image reading section, and therefore it is possible to obtain a high quality transferred image.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 8 is a view showing one example of amplification gain values at ten sampling points and sampling positions

PREFERRED EMBODIMENT OF THE INVENTION

Hereinafter, with reference to the attached figures, an embodiment which is appropriate to an image reading device, an image reading method and an image forming apparatus according to the present invention will be described. Here, the following description is not intended to limit the present invention.

Figure 1:
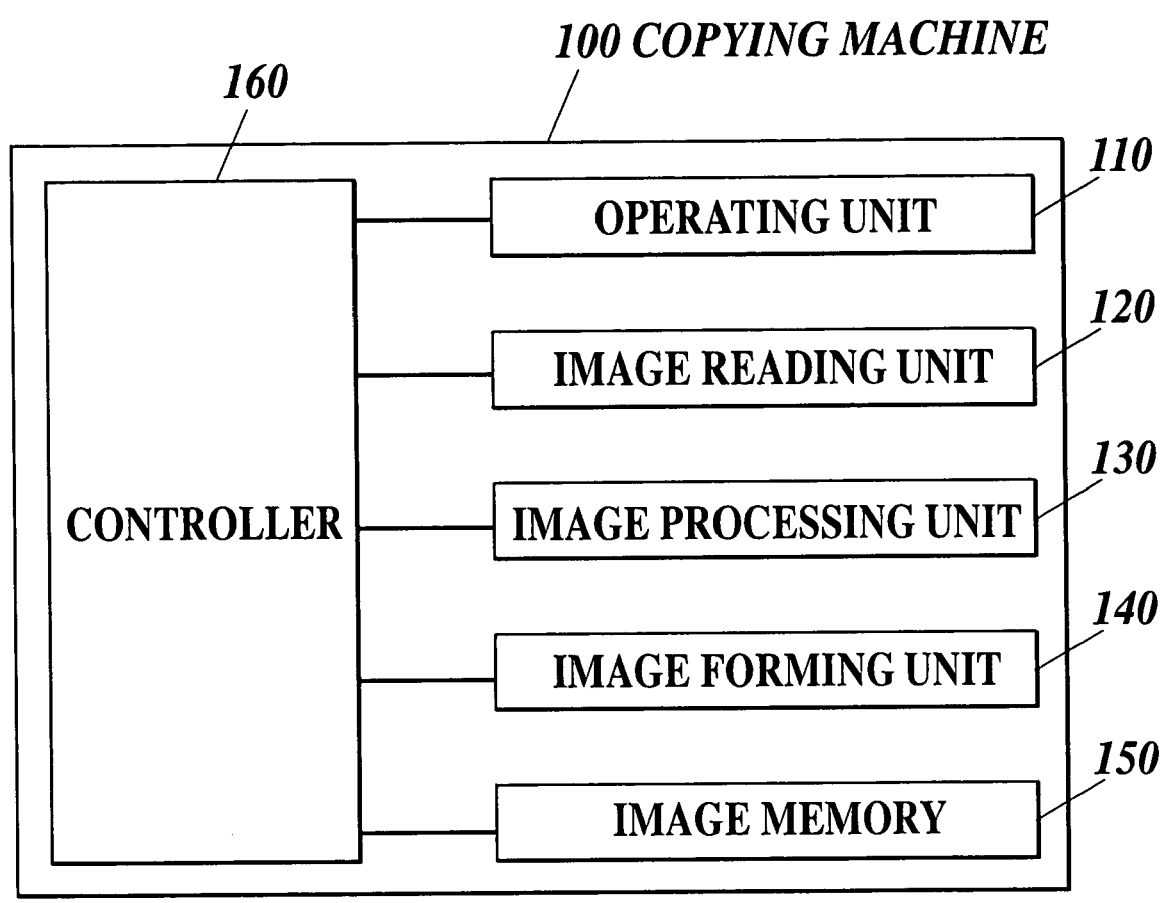
FIG. 1 is a block diagram showing a whole structure of a copying machine to which an image forming apparatus of the present invention is applied.

First, a whole structure of a copying machine 100 to which an image forming apparatus of the present embodiment will be described with reference to FIG. 1. The copying machine 100 is used to copy letters, figures or the like that are drawn on a document on transfer paper as image information. The copying machine 100 comprises an operating unit 110, an image reading unit 120, an image processing unit 130, an image forming unit 140, an image memory 150 and a controller 160 which controls these units.

The operating unit 110 is an inputting unit through which an operator assigns information such as the number of sheets of transferring, transfer density, a selection of transfer paper and the like that are assigned by the operator, to the controller 160. The operating unit 110 comprises a touch panel, operation keys and the like. The image reading unit 120 is used to read image information which is drawn on a document and to convert the analog signals, which indicate image information, into digital signals. The image processing unit 130 performs image processing on the read image information read by the image reading unit 120, for improving quality of image information to be transferred.

The image forming unit 140 transfers the image information image-processed by the image processing unit 130 on transfer paper, for creating a transferred document. The image memory 150 therein accumulates and stores an image which is read by the image reading unit 120 and image-processed by the image processing unit 130. The controller 160 controls each unit structuring the copying machine 100, for administering and operating steps from reading a document to transferring to a document.

Figure 2:
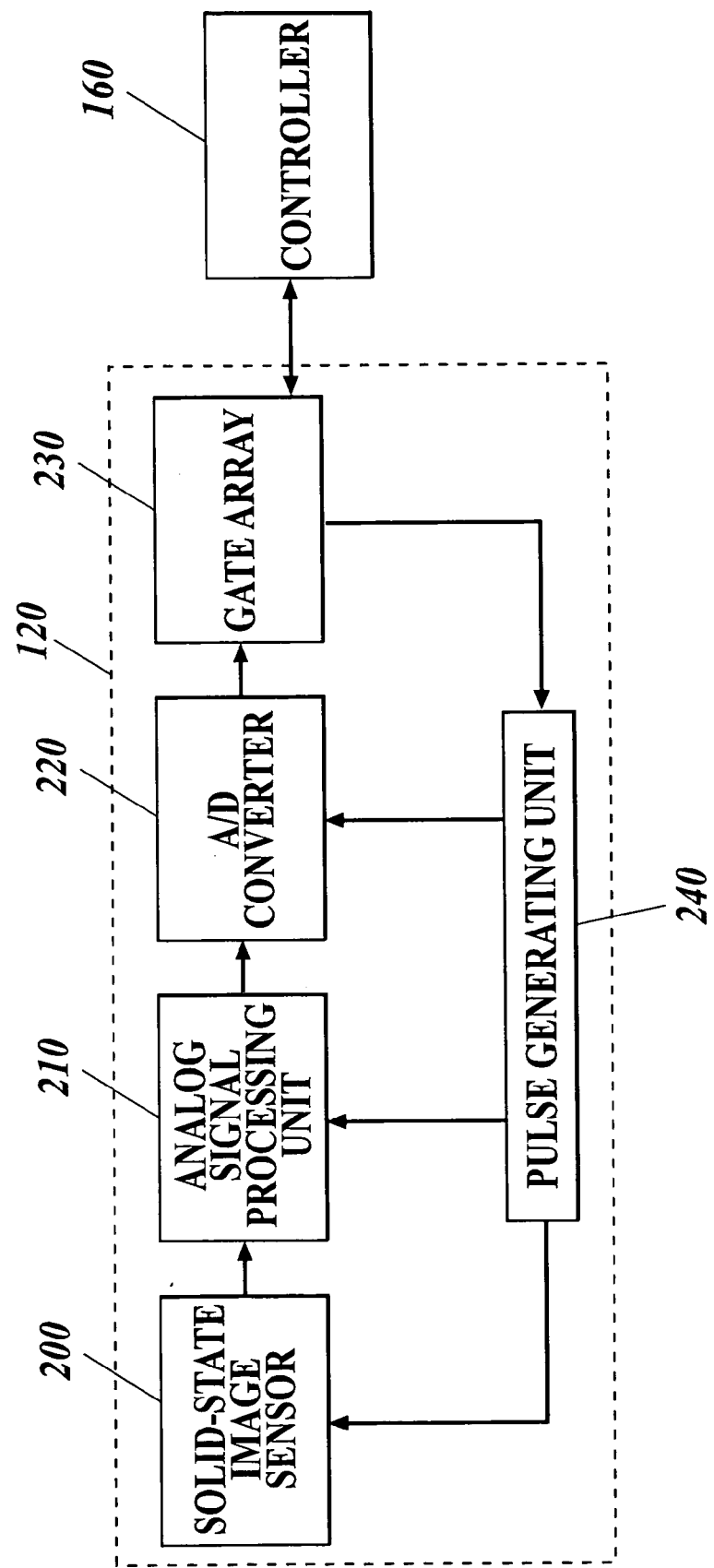
FIG. 2 is a block diagram showing an image reading unit in the copying machine.

Next, with reference to FIG. 2, a concrete structure of the image reading unit 120 will be described. The image reading unit 120 has a function to convert image information of a document from light signals into analog electric signals, and further into digital signals. The image reading unit 120 comprises a solid-state image sensor 200, an analog signal processing unit 210, an A/D converter 220, a gate array 230 and a pulse generating unit 240.

The solid-state image sensor 200 comprises a CCD (Charge Coupled Device) light sensor. The solid-state image sensor 200 reads light image information of a document illuminated by a lamp (not shown) with photodiode arrays, and converts it into electric signals. These electric signals are sequentially read out by CCD and analog signal registers that are located between the photodiode arrays.

The analog signal processing unit 210 extracts a signal period from the electric signals read out from the solid-state image sensor, the signal period including electric charge information accumulated within the photodiode, and the analog signal processing unit 210 performs the sampling.

The A/D converter 220 converts the electric signals including the electric charge information, which is sampled by the analog signal processing unit 210, from analog signals into digital signals. The gate array 230 functions as an interface between the image reading unit 120 and the other processing units of the copying machine 100. The gate array 230 distributedly transfers the electric signals which are converted into digital signals, to the controller 160 or, via a communication pass (not shown), to the image memory 150 or the like.

The controller 160 comprises a CPU (Central Processing Unit), an oscillator which generates a basic clock, and the like. The controller 160 generates signals for administering the whole control of the image reading unit 120. In particular, since signals for controlling the solid-state image sensor 200, the analog signal processing unit 210 and the A/D converter 220 are required to have highly accurate timing, they are generated through the pulse generating unit 240.

The pulse generating unit 240, based on a control signal from the controller 160, generates signals for controlling the solid-state image sensor 200, the analog signal processing unit 210 and the A/D converter 220. The pulse generating unit 240, for example with the combination of delay line and selectors, is capable of generating a control pulse having highly accurate timing.

Figure 3:
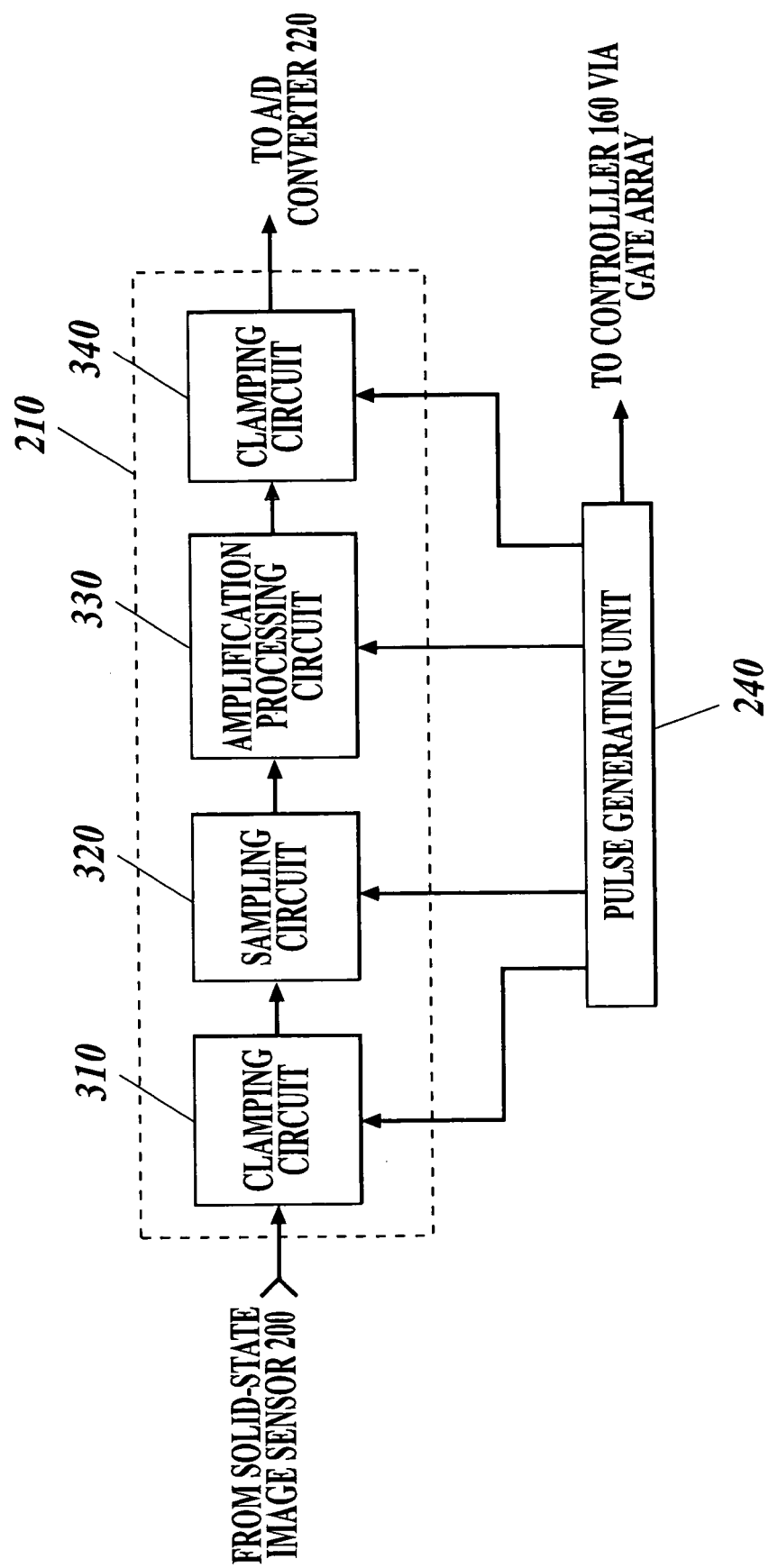
FIG. 3 is a block diagram showing an analog signal processing unit of the image reading unit.

Next, with reference to FIG. 3, a concrete structure of the analog signal processing unit 210 will be described. As shown in FIG. 3, the analog signal processing unit 210 comprises a clamping circuit 310, a sampling circuit 320, an amplification processing circuit 330 and a clamping circuit 340.

Signals outputted from the solid-state image sensor 200 are inputted to the clamping circuit 310, and in synchronization with the pulses from the pulse generating unit 240, polarity of electric signals of the signal period including a shift of dc potential and image information is reversed.

The sampling circuit 320 samples and holds the signals outputted from the clamping circuit 310 in synchronization with pulses from the pulse generating unit 240. The amplification processing circuit 330 amplifies an output of the sampling circuit 320, which is sampled and held, up to an appropriate voltage (set voltage) for performing the A/D conversion with the A/D converter 220. Here, the amplification processing circuit 330 comprises a varying section for changing amplification gain according to the control signals from the pulse generating unit 240.

The clamping circuit 340 shifts the dc potential in synchronization with the pulse from the pulse generating unit 240, for adjusting dc component other than image information generated by the amplification processing circuit 330. Thereafter, the A/D converter 220 converts the analog voltage into digital signals.

Figure 4:
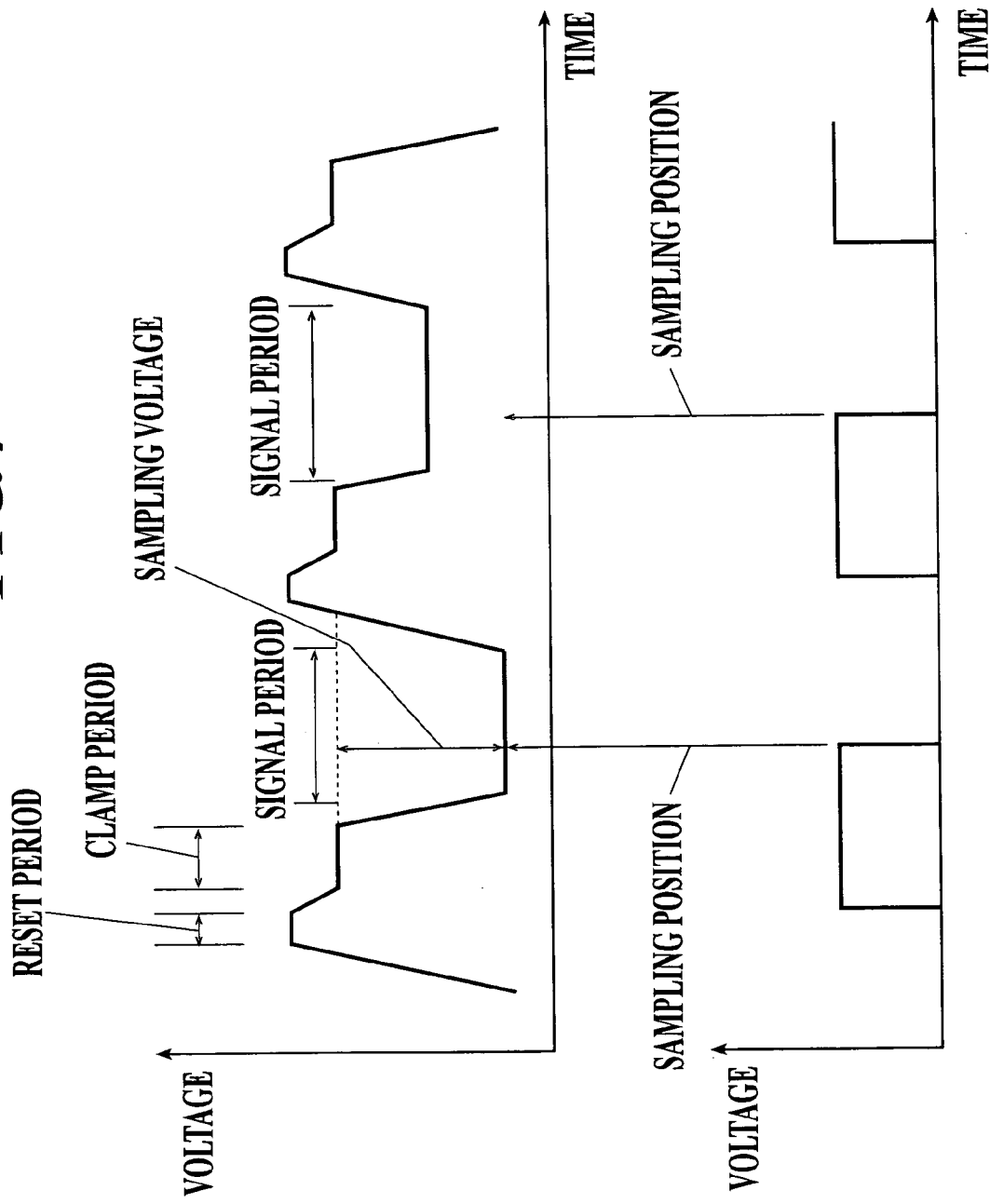
FIG. 4 is a view showing an output signal from a solid-state image sensor and a sampling signal.

Here, a sampling operation performed by the sampling circuit 320 of the analog signal processing unit 210 will be described with reference to FIG. 4. Upper part of FIG. 4 is a view showing an electric signal inputted to the clamping circuit 310 from the solid-state image sensor 200. The electric signal is a signal in synchronization with a horizontal synchronizing pulse generally having a cycle period of several tens nsecs. The electric signal comprises a reset period, a clamp period during which the clamping circuit 310 performs the clamping, a signal period during which voltage proportional to electric charge amount accumulated in photodiode within CCD is outputted, and a transient period during-which these periods are switched.

Lower part of FIG. 4 is an example of a control pulse inputted to the sampling circuit 320 from the pulse generating unit 240. According to the inputted control pulse, the sampling circuit 320 samples and holds signals outputted from the solid-state image sensor 200 at the time that the pulse gets down. Therefore, in the example of FIG. 4, voltage in the signal period of the outputted signals is sampled and held. By the way, the sampling circuit 320 may sample and hold the voltage at the time that the pulse gets up. Here, since, in regard to the outputted signals from the solid-state image sensor 200, the clamping circuit 310 moves dc potential during the clamp period, voltage which is sampled and held by the sampling circuit 320 is a sampling voltage which is a difference between the voltage during the clamp period and the voltage at the sampling position, as shown at upper part of FIG. 4.

Next, operations of the analog signal processing unit 210 according to the present embodiment and the controller 160, which controls the analog signal processing unit 210, will be described with reference to a flowchart of FIG. 5.

First, setting of sampling point number and sampling width is done to the controller 160 (Step S1). Step S1 may be done by an operator externally, or may be preset based on specification limit of the pulse generating unit 240. However, as a sampling range which is the product of the sampling point number and the sampling width, it is preferable to set a range which sufficiently exceeds the signal period shown at upper part of FIG. 4.

Next, the controller 160 sets an initial sampling position (position to start sampling) (Step S2). The initial sampling position is generally set right after the clamp period shown at upper part of FIG. 4. The initial sampling position is transmitted to the pulse generating unit 240 via the gate array 230. Hereafter, sampling point number, a sampling range and an initial sampling position are called as "sampling condition" as a whole.

The pulse generating unit 240 generates pulses corresponding to a timing of the set sampling position, to the sampling circuit 320, and the sampling circuit 320 samples and holds the voltage (Step S3).

Thereafter, the amplification processing circuit 330 amplifies this hold voltage. Here, the amplification processing circuit 330 automatically adjusts the gain so as to correspond to a predetermined output voltage (Step S4), and the controller 160 obtains the adjusted amplification gain value from the amplification processing circuit 330 and stores it (Step S5).

Thereafter, the controller 160 judges whether the sampling on the set point number is completed (Step S6). If it is judged that the sampling on the set point number in Step S6 is not completed (Step S6; No), the controller 160 moves the sampling position as much as the sampling width set in Step S (Step S7). Then, the process goes to Step S3, and the steps from S3 to S7 are repeated until the sampling on the set point number is completed.

Figure 6:
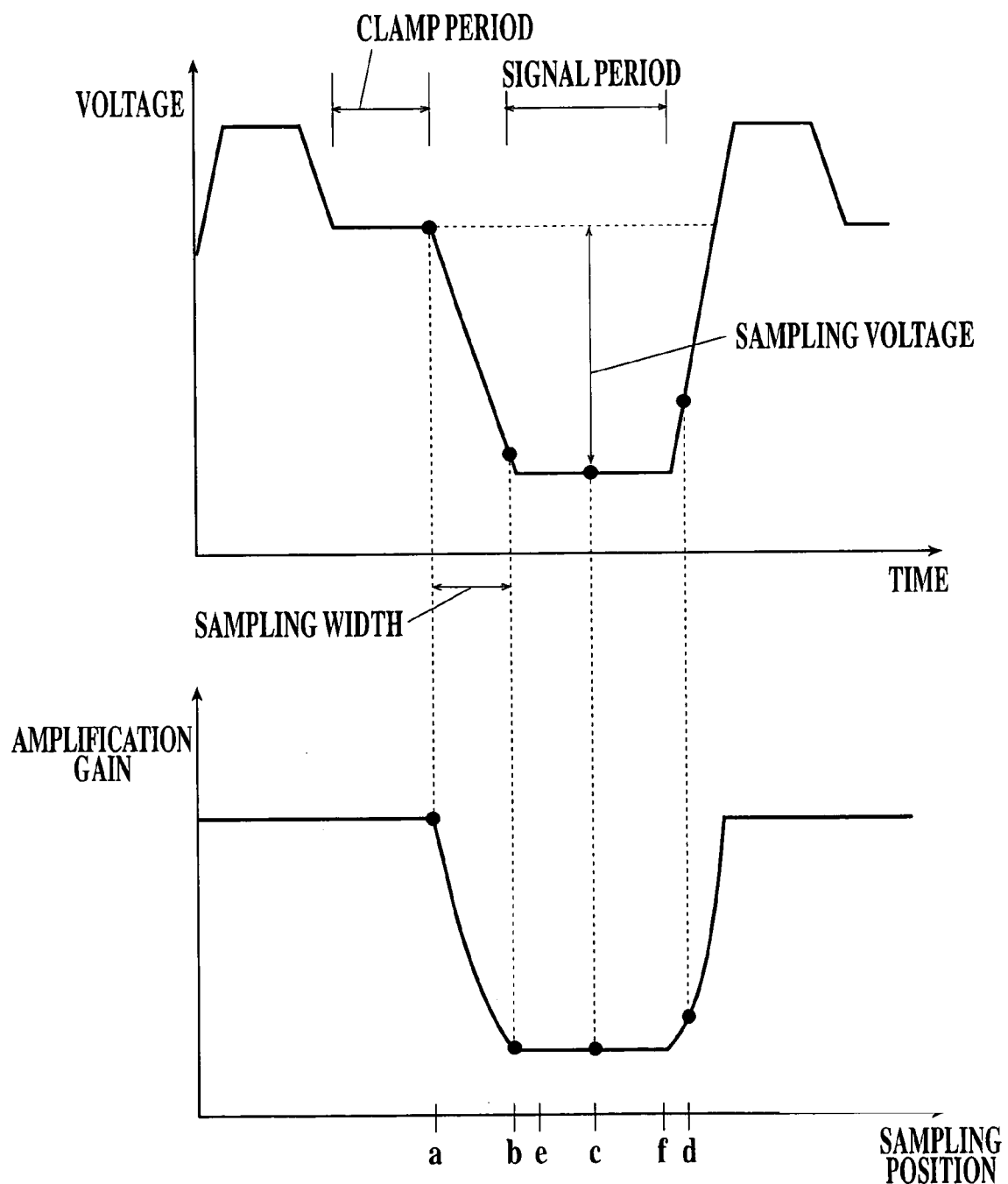
FIG. 6 is a pattern diagram showing an operation of the analog signal processing unit.

FIG. 6 is a pattern diagram showing the steps from S3 to S7. Upper part of FIG. 6 shows an output waveform as much as one cycle of the solid-state image sensor 200, as well as that of upper part of FIG. 4. Lower part of FIG. 6 is a view showing the amplification gain value of the amplification processing circuit 330 with the sampling positions defined as horizontal axis, and it is in synchronization with the horizontal axis (time) of upper part of FIG. 6. Since an initial sampling position "a" which is generally set right after the clamp period has extremely small sampling voltage, the amplification gain value becomes larger.

Thereafter, the sampling position is delayed as much as the sampling width, and sampling voltage at a next sampling position (for example, point "b") is obtained and the gain is automatically adjusted. The amplification gain value at this moment becomes smaller in inverse proportion to the sampling voltage. By repeating this operation as many times as the sampling point number, the sampling position reaches a position which exceeds the signal period.

Figure 5:
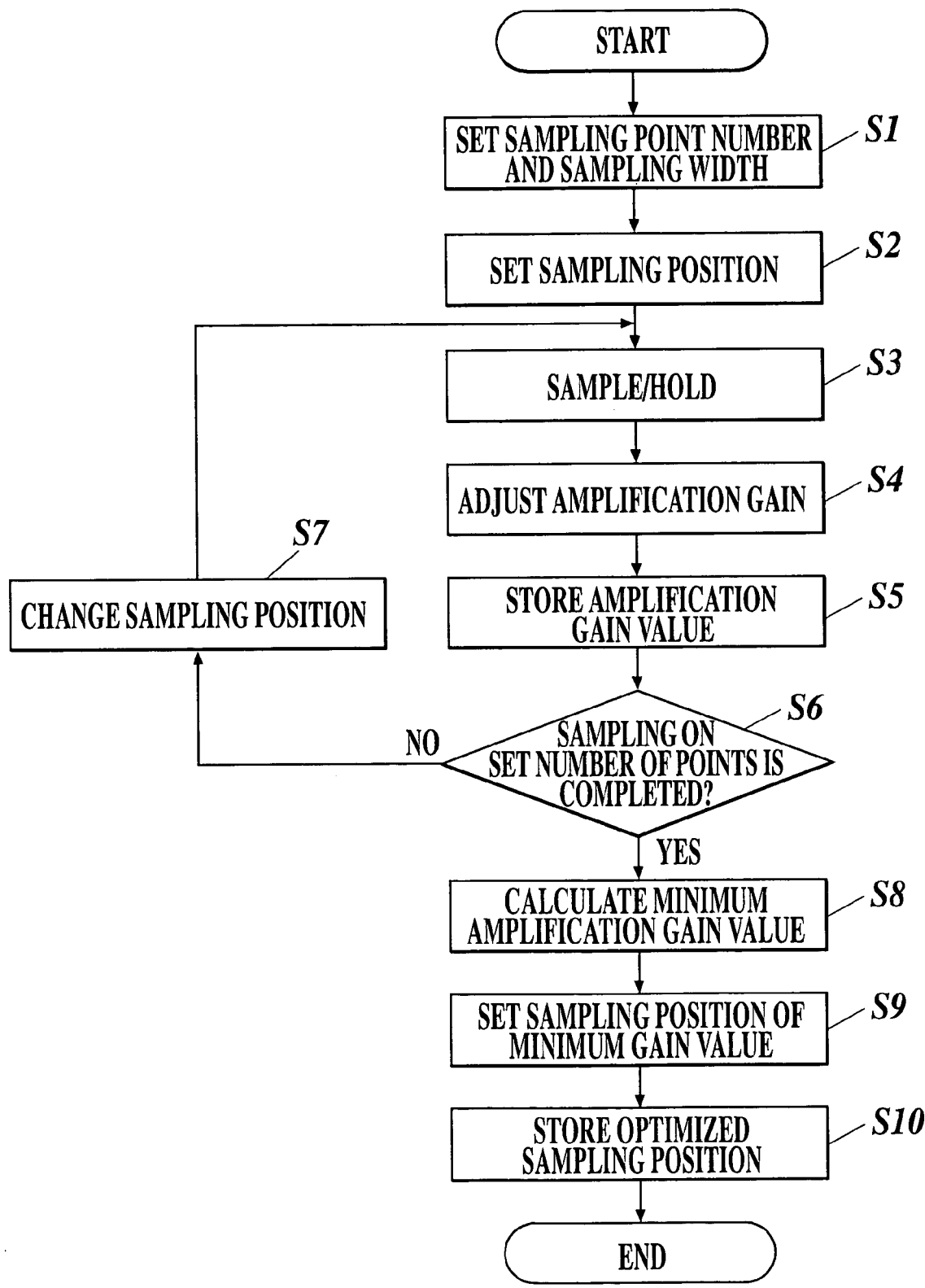
FIG. 5 is a flowchart illustrating an operation of the analog signal processing unit.

Back to FIG. 5, if it is judged in Step S6 that the sampling on the set sampling point number is completed (Step S6; Yes), the controller 160 calculates the minimum value among the amplification gain values obtained in Step S5 (Step S8), and sets a sampling position having the minimum amplification gain value to the pulse generating unit 240 via the gate array 230 (Step S9). Then, the controller 160 stores the sampling position set in Step S9 as an optimized sampling position (Step S10), and completes the present process.

In the example of FIG. 6, the amplification gain value becomes minimum at the sampling position "c", which is located within the signal period during which the sampling voltage becomes maximum. Therefore, this sampling position "c" is set to the pulse generating unit 240.

Figure 7:
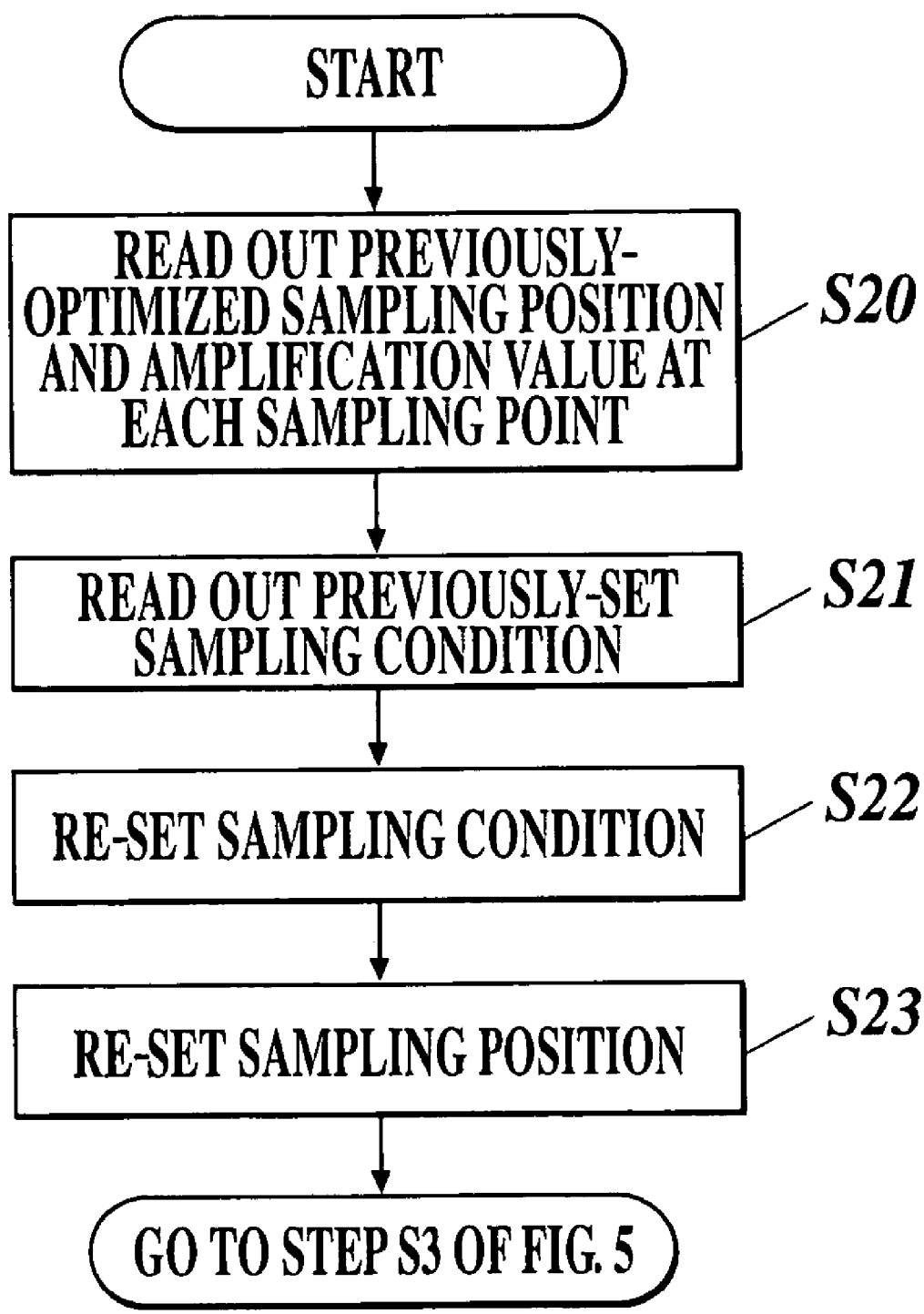
FIG. 7 is a flowchart illustrating a case of re-performing the process to optimize a sampling position shown in FIG. 5.

Next, with reference to a flowchart of FIG. 7 and FIG. 8, a process in the case of re-performing the sampling position optimization process shown in FIG. 5 will be described. FIG. 8 is a view showing an example of a relation among a sampling point, an amplification gain value and a sampling position in the previously performed sampling position optimization process.

First, an optimized sampling position which is stored in Step S10 of the previous optimization process (FIG. 5), and amplification gain values at each sampling point that is stored in Step S5 are read out (Step S20).

Next, a previously-set sampling condition is read out (Step S21). In the sampling condition read out in Step S21, according to an example of lower part of FIG. 6 and FIG. 8, an initial sampling position is set to "a", a sampling range is set between "a" and "d" and sampling point number is set to 10 points.

Next, based on the optimized sampling position, the amplification gain values at each sampling point and the sampling condition, each being read out in Step S20 and Step S22, a sampling condition is reset (Step S22). In Step S22, at first, by using the previously-optimized sampling position as a reference, sampling points within a range which has a comparatively flat change of amplification gain values are selected, and based on the selected sampling points, a sampling condition is reset. For example, according to FIG. 6 and FIG. 8, by using a sampling position "c" which is previously optimized as a reference, sampling points within a range between "e" and "f", within which a change of amplification gain values is under 0.2, are selected. Then, a sampling condition in which an initial sampling position is "e", a sampling range is between "e" and "f" and a sampling point number is six points is set.

Next, based on the sampling condition reset in Step S22, a sampling position is reset (Step S23), and the operation goes to Step S3 of FIG. 5.

As mentioned above, in the present embodiment, a moment at which the sampling circuit 320 samples an output of the solid-state image sensor 200 is made changeable, and the output of the sampling circuit 320 is made constant according to the automatic gain adjustment of the amplification processing circuit 330. Therefore, by detecting a sampling position at the moment where the amplification gain value becomes minimum among varied amplification gain values of the amplification processing circuit 330 obtained by varying the sampling position, it is possible to extract a sampling position located within the signal period of an output waveform of the solid-state image sensor 200, and thereby it is possible to accurately extract image information of the solid-state image sensor as electric signals.

Further, if a sampling position optimization process is to be re-performed, by resetting a sampling condition based on the optimized sampling position which is obtained in the previous optimization process and the amplification gain values at each sampling point, it is possible to reduce an operation time of the optimization process at the second time or later. Thereby, it is possible to make an operation of the whole image reading unit 120 and the copying machine 100 faster.

Here, in order to make the operation of the whole image reading unit 120 and the copying machine 100 even faster, without resetting the sampling condition, by setting the optimized sampling position which is obtained at the previous optimization process as-is to the pulse generating unit 240, the sampling is re-performed.

Further, since optimization of a sampling position in the present embodiment is done by the controller 160, with an operator giving an instruction to the controller 160 through the operating unit 110, it is possible to do the optimization at any time after the power is on. Further, by making the controller 160 set information indicating an activating time of the optimization process and indicating whether there is an optimization operation after the power is on as an activating condition of the sampling position optimization process based on an instruction signal inputted through the operating unit 110, it is possible to perform the sampling position optimization process according to the set activating condition.

Further, in the present embodiment, the control is done by the controller 160. However, with CPU provided within the image reading device 120, extraction of the optimal sampling position may be done locally within the image reading device, without the use of the controller 160.

Further, in the present embodiment, the number of the optimal sampling position of the image reading device is one. However, in the case of a color image, due to some reasons such as, the characteristic of the solid-state image sensor differs depending on a constituent color, a signal waveform of each constituent color which is outputted from the solid-state image sensor differs according to variation of lamp light amount with time, and the like, the optimal sampling position differs depending on each constituent color information. Therefore, by optimizing a sampling position within a signal period for each constituent color information, it is possible to extract image information of constituent colors more accurately.

The entire disclosure of a Japanese Patent Application No. Tokugan 2002-23159 filed on Jan. 31, 2002, including specifications, claims, drawings and summaries are incorporated herein by reference in their entirety.

What is claimed is:

1. An image reading device comprising:
   a solid-state image sensor for converting image information from a light signal into an electric signal;
   an analog processing section for generating an analog processing signal by sampling and amplifying the electric signal at a sampling position;
   an A/D converting section for converting the analog processing signal into a digital signal;
   a pulse generating section for generating a control pulse to the solid-state image sensor, the analog processing section and the A/D converting section; and
   a control section for controlling a pulse generating timing of the pulse generating section,
   wherein the analog processing section comprises an amplification processing section for amplifying the electric signal by varying an amplification gain of the electric signal so as to set an output voltage to a set voltage, the pulse generating section comprises a varying section for varying the sampling position of the electric signal, and the control section comprises an optimizing section for optimizing the sampling position based on variance information of amplification gain values obtained when the varying section varies the sampling position.

2. The device of claim 1, wherein the analog processing section comprises a clamping section for varying dc component of the electric signal before sampling the electric signal.

3. The device of claim 2, wherein the optimizing section sets the sampling position having a minimum amplification gain value among the amplification gain values obtained by varying the sampling position, as an optimized sampling position.

4. The device of claim 1, wherein the control section comprises a sampling condition setting section for setting a sampling condition of the electric signal, and the optimizing section optimizes the sampling position according to the set sampling condition.

5. The device of claim 4, wherein the sampling condition comprises a position to start sampling the electric signal, a sampling point number and a sampling range.

6. The device of claim 4, wherein the control section stores the sampling position optimized by the optimizing section, and the amplification gain values at each sampling point, when the optimizing section is to be operated once again, the sampling condition setting section resets the sampling condition based on the sampling position and the amplification gain values at each sampling point, each of which is stored in a previous operation of the optimizing section, and the optimizing section optimizes the sampling position once again according to the reset sampling condition.

7. The device of claim 1, further comprising an operating section for an operator to input control information, wherein the control section comprises an activating condition setting section for setting an activating condition of the optimizing section according to an operation at the operating section, and activates the optimizing section according to the set activating condition.

8. The device of claim 7, wherein the activating condition comprises information indicating an activating time of the optimizing section and existence of an optimization operation after a power is on.

9. The device of claim 1, wherein, when the optimizing section is to be operated once again, the control section sets the sampling position optimized by a previous operation of the optimizing section, to the pulse generating section.

10. The device of claim 1, wherein the image information comprises color image information.

11. The device of claim 10, wherein the pulse generating section comprises the varying section for each constituent color of the color image information, and the control section comprises the optimizing section for each constituent color of the color image information.

12. An image reading method comprising:

converting image information from a light signal into an electric signal;

generating an analog processing signal by sampling and amplifying the electric signal at a sampling position;

A/D-converting the analog processing signal into a digital signal;

generating a control pulse for controlling the generating of the analog processing signal and the A/D-converting; and controlling a timing for generating a pulse when the control pulse is generated, wherein the generating of the analog processing signal comprises amplifying the electric signal by varying an amplification gain of the electric signal so as to set an output voltage to a set voltage, the generating of the control pulse comprises varying the sampling position of the electric signal, and the controlling comprises optimizing the sampling position based on variance information of amplification gain values obtained by varying the sampling position.

13. An image forming apparatus comprising:

an operating section for an operator to input information;

an image reading section for converting a document into an electric signal as image information, for sampling and amplifying the electric signal at a sampling position;

an image processing section for applying an image process on the image information; and an image transferring section for transferring the image information on transfer paper, wherein the image reading section comprises:

an amplification processing section for amplifying the electric signal so as to set an output voltage to a set voltage; and an optimizing section for varying the sampling position of the electric signal, and for optimizing a sampling position by calculating a minimum amplification gain value among amplification gain values obtained by varying the sampling position.

* * * * *